United States Patent [19]
Nakashima et al.

[11] Patent Number: 6,055,085
[45] Date of Patent: Apr. 25, 2000

[54] PHOTOCATALYTIC GLASS PANE EQUIPPED WITH LIGHT SOURCE FOR ACTIVATING SAME

[75] Inventors: Hiroshi Nakashima; Seiji Yamazaki, both of Mie, Japan

[73] Assignee: Central Glass Company, Limited, Yamaguchi, Japan

[21] Appl. No.: 09/177,134

[22] Filed: Oct. 22, 1998

[30] Foreign Application Priority Data

Oct. 23, 1997 [JP] Japan .................................. 9-290650
Dec. 18, 1997 [JP] Japan .................................. 9-349089

[51] Int. Cl.⁷ ................................ G02F 1/03; E06B 7/12
[52] U.S. Cl. ......................... 359/241; 359/507; 359/512; 359/350; 52/172
[58] Field of Search .................................. 359/507, 512, 359/350, 241; 52/172

[56] References Cited

U.S. PATENT DOCUMENTS

| | | | |
|---|---|---|---|
| 5,854,708 | 12/1998 | Komatsu et al. | 359/512 |
| 5,873,203 | 2/1999 | Thiel | 52/172 |
| 5,935,717 | 8/1999 | Oishi et al. | 428/480 |
| 5,939,194 | 8/1999 | Hashimoto et al. | 428/411.1 |

FOREIGN PATENT DOCUMENTS

| | | |
|---|---|---|
| 590 477 A1 | 4/1994 | European Pat. Off. |
| 816 466 A1 | 1/1998 | European Pat. Off. |
| 820 967 A1 | 1/1998 | European Pat. Off. |

OTHER PUBLICATIONS

Patent Abstracts of Japan, vol. 98, No. 1, Jan. 30, 1998 (Abstract of JP 09–255366).

*Primary Examiner*—Georgia Epps
*Assistant Examiner*—Evelyn A. Lester
*Attorney, Agent, or Firm*—Evenson, McKeown, Edwards, & Lenahan, P.L.L.C.

[57] ABSTRACT

The invention relates to a photocatalytic glass pane including (a) a glass substrate having (1) major surfaces that are substantially parallel with and opposed to each other and (2) an edge surface that connects the major surfaces together; (b) a photocatalytic film formed on at least one of the major surfaces of the glass substrate; and (c) a light source for exciting the photocatalytic film. A light from the light source enters the glass substrate from its edge surface and then is reflected totally within the glass pane. Another photocatalytic glass pane of the invention is substantially the same as the above, except that the light enters the glass substrate from its peripheral surface. It is optional to form a prism on the peripheral surface. Alternatively, the peripheral surface may be inclined such that the glass substrate is tapered at a position of the peripheral surface. With this, the light is totally reflected within the another glass pane, too. Thus, the photocatalytic glass panes of the invention are capable of substantially preventing light rays from escaping from the major surfaces thereof. With this, the photocatalytic film can effectively be excited or activated to oxidatively decompose organic contaminants thereon.

25 Claims, 5 Drawing Sheets

PHOTOCATALYTIC GLASS PANE EQUIPPED WITH LIGHT SOURCE FOR ACTIVATING SAME

BACKGROUND OF THE INVENTION

The present invention relates to a photocatalytic glass pane equipped with a light source for photochemically activating or exciting a photocatalytic film of the glass pane. Organic contaminants on the photocatalytic film are oxidatively decomposed by activating the photocatalytic film. With this, the surface of the photocatalytic film becomes hydrophilic. Thus, it becomes possible to prevent the formation of dew drops thereon and the resultant fogging.

In order to activate the photocatalytic film, it is necessary to irradiate the film with an excitation light. The sunlight in the ultraviolet region can effectively be used as the excitation light. In case that the photocatalytic glass pane is disposed in a place where the sunlight is not sufficiently strong, it may be necessary to artificially shed the ultraviolet or visible rays from a light source on the photocatalytic film. The ultraviolet rays escaped from the photocatalytic glass pane may, however, cause human health problems. Furthermore, it may not be desirable in some cases to allow even the visible rays to escape from the photocatalytic glass pane.

SUMMARY OF THE INVENTION

It is therefore an object of the present invention to provide a photocatalytic glass pane equipped with a light source for activating a photocatalytic film of the glass pane, which glass pane is capable of substantially preventing light rays from escaping from the glass pane and thus effectively activating the photocatalytic film.

According to a first aspect of the present invention, there is provided a first photocatalytic glass pane comprising (a) a glass substrate having (1) first and second major surfaces that are substantially parallel with and opposed to each other and (2) an edge surface that connects the first and second major surfaces together; (b) a photocatalytic film formed on at least one of the first and second major surfaces of the glass substrate; and (c) a light source for exciting the photocatalytic film. This light source is disposed at a position relative to a laminate of the glass substrate and the photocatalytic film such that a first light from the light source enters the glass substrate from the edge surface thereof and then is reflected totally within the laminate, thereby to excite the photocatalytic film and prevent the first light from escaping from first and second major surfaces of the laminate.

According to a second aspect of the present invention, there is provided a second photocatalytic glass pane comprising (a) a glass substrate having first and second major surfaces that are substantially parallel with and opposed to each other; (b) a photocatalytic film formed on at least one of the first and second major surfaces of the glass substrate; and (c) a light source for exciting the photocatalytic film. This light source is disposed at a position relative to a laminate of the glass substrate and the photocatalytic film such that a first light from the light source enters the glass substrate from a peripheral surface of the glass substrate and then passes from the glass substrate into the photocatalytic film at an angle of incidence, thereby to reflect the first light totally within the laminate to excite the photocatalytic film. The peripheral surface of the glass substrate does not have thereon the photocatalytic film, and may be inclined such that the glass substrate is tapered at a position of the peripheral surface and thus that the first light is reflected totally within the laminate.

DESCRIPTION OF THE PREFERRED EMBODIMENTS

A photocatalytic glass pane according to the present invention will be described in detail in the following. This photocatalytic glass pane may be used for vehicular window, show window, showcase, architectural window, and the like. The photocatalytic glass pane has at least one photocatalytic film formed on at least one of first and second major surfaces of a glass substrate thereof. With this, for example, it becomes possible to prevent fogging on an inner surface of a vehicular, kitchen or bath room window pane by irradiating the film with light rays, particularly ultraviolet rays.

In the invention, it is optional that the photocatalytic film is formed on one major surface of the glass substrate, and a reflective metal (e.g., silver) film is formed on the other major surface of the glass substrate. With this, the obtained glass pane can be used as an antifogging mirror having the photocatalytic film on the front side. It becomes possible to prevent fogging on inner and outer major surfaces of the photocatalytic glass pane by providing two photocatalytic films on both major surfaces of the glass substrate. Exemplary raw materials of the glass substrate are aluminosilicate alkali glass, alkalisilicate glass, borosilicate glass, alkali lime silicate glass (e.g., soda-lime-silica glass), and tempered ones of these.

In the invention, the photocatalytic glass pane has a light source for exciting a photocatalytic substance of the photocatalytic film formed on the glass substrate. The light from the light source preferably contains ultraviolet rays in a wavelength range from about 320 to about 390 nm, which can effectively activate anatase-type titania as a photocatalytic substance. Besides anatase-type titania, the photocatalytic substance preferably contains at least one oxide selected from silica, alumina, tin oxide and zirconium oxide, in order to improve the photocatalytic film in strength and adhesion to the glass substrate.

In the invention, it is optional to provide an interlayer film interposed between the glass substrate and the photocatalytic film. This interlayer film may have an adjusted thickness and a refractive index that is lower than that of the photocatalytic film, such that an undesirable reflection from the photocatalytic film, causing a double image, can be diminished by light interference.

In the invention, the light from the light source enters a laminate of the glass substrate and the photocatalytic film. During the total internal reflection of the light within this laminate, the light intensity gradually decreases as it is absorbed by the glass substrate and activates the photocatalytic film. Thus, it is preferable to choose the initial light intensity in view of the size of the glass substrate and/or the area of the photocatalytic film.

1. PHOTOCATALYTIC GLASS PANES ACCORDING TO THE FIRST ASPECT OF THE INVENTION

Figure 1A:
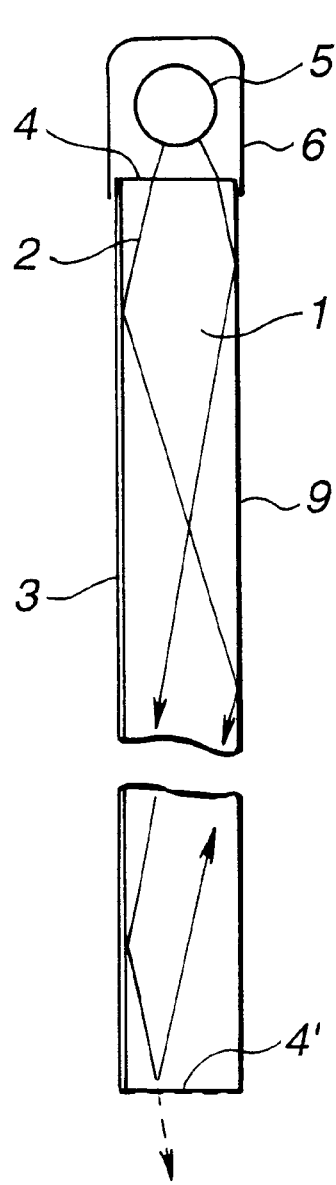
FIG. 1A is a sectional view showing a photocatalytic glass pane according to the first aspect of the present invention, in which light rays from a light source lamp impinge on an edge surface of the glass substrate.

In the following, photocatalytic glass panes according to the first aspect of the present invention will be described in detail. FIG. 1A shows a photocatalytic glass pane according to the first aspect of the present invention. This photocatalytic glass pane has a glass substrate 1, a photocatalytic film 3 formed on one major surface of the glass substrate 1, and a light source (lamp) 5. According to FIG. 1A, the other major surface 9 of the glass substrate 1 does not have thereon a photocatalytic film. The lamp 5 is disposed at a position relative to a laminate of the glass substrate 1 and the photocatalytic film 3 such that first light rays 2 from the lamp 5 enter the laminate from an edge surface 4 of the glass substrate 1 and then, as will be clarified hereinafter, is repeatedly reflected totally within the laminate. In other words, the first light rays 2 are prevented from escaping from first and second major surfaces of the laminate. Thus, the photocatalytic film 3 is excited or activated, thereby to oxidatively decompose organic contaminants thereon. With this, the photocatalytic film 3 becomes hydrophilic, and thus fogging can be prevented.

According to the first aspect of the invention, both major surfaces of the glass substrate 1 are substantially parallel with and opposed to each other. Thus, the photocatalytic film 3 is also substantially parallel with the other major surface 9 of the glass substrate 1. Furthermore, the edge surface 4 of the glass substrate 1 is substantially perpendicular to each of the major surfaces of the glass substrate 1. The glass substrate 1 may be prepared by cutting a ribbon-like float glass plate (blank) along a cutting surface. This cutting surface may become the edge surface 4 of the glass substrate 1. The lamp 5 may be positioned above the edge surface 4 of the glass substrate 1, as illustrated. The lamp 5 is covered with a covering member (lampshade) 6 such that second light rays, which do not directly impinge on the edge surface 4, are concealed by the lampshade 6. In other words, a person close to the photocatalytic glass pane is not exposed to the second light rays of the lamp 5.

Figure 1B:
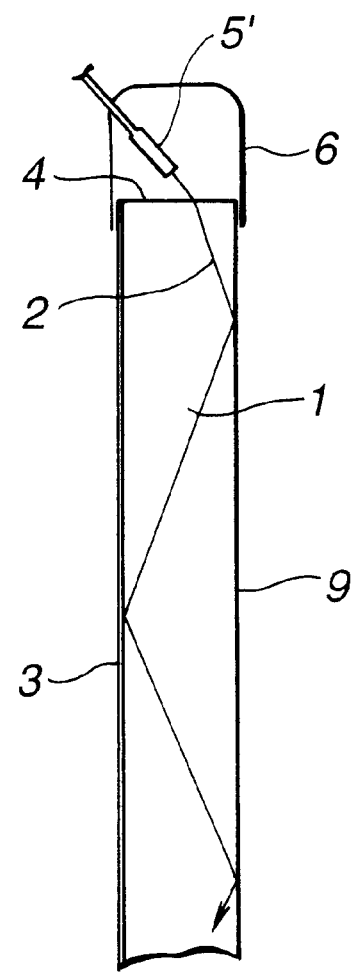
FIG. 1B is a view similar to FIG. 1A, but showing another photocatalytic glass pane, in which light rays from a light emitting nozzle impinge on the edge surface thereof.

FIG. 1B shows another photocatalytic glass pane according to the first aspect of the present invention, which is the same as that of FIG. 1A, except that a light emitting nozzle 5' connected to an optical fiber (not shown) is used for allowing light rays to impinge on the edge surface 4, in place of the lamp 5. In fact, light rays for exciting the photocatalytic film 3 from a light source (not shown) are introduced into the optical fiber through a condenser (e.g., convex lens or concave mirror), then passed through the optical fiber, and then emitted from the nozzle 5' towards the edge surface 4 of the glass substrate 1. In this case, according to need, the light source may be disposed at another place away from the photocatalytic glass pane. Furthermore, it becomes possible to make the photocatalytic glass pane smaller in size by using the light emitting nozzle 5', as compared with the lamp 5.

The escape of light rays from another edge surface 4' (see FIG. 1A) of the glass substrate 1 of a photocatalytic glass pane according to the first aspect of the invention, which has the same size as that of the after-mentioned Example 1, was examined, as follows. In fact, the distance between the edge surfaces 4, 4' was 455 mm. Firstly, as shown in FIG. 1B, light rays from the light emitting nozzle 5' have been allowed to obliquely impinge on the edge surface 4 of the glass substrate 1. In fact, the light intensity on the edge surface 4 was adjusted to be 20 mW/cm$^2$. Thus, the light rays were reflected totally within a laminate of the glass substrate and the photocatalytic film. It was found that light rays having an intensity of at least 5 mW/cm$^2$ reached the edge surface 4'. In other words, it was confirmed that the light rays do not disappear on the way to the edge surface 4', but assuredly reach the edge surface 4'. Thus, it is assumed that the photocatalytic film is entirely activated by the light rays until the light rays reach the edge surface 4', even though the light rays are absorbed by the glass substrate and the photocatalytic film. In other words, it is preferable to adjust the light intensity of the light rays, depending on the size of the glass substrate. With this, it becomes possible to entirely activate the photocatalytic film.

Figure 2:
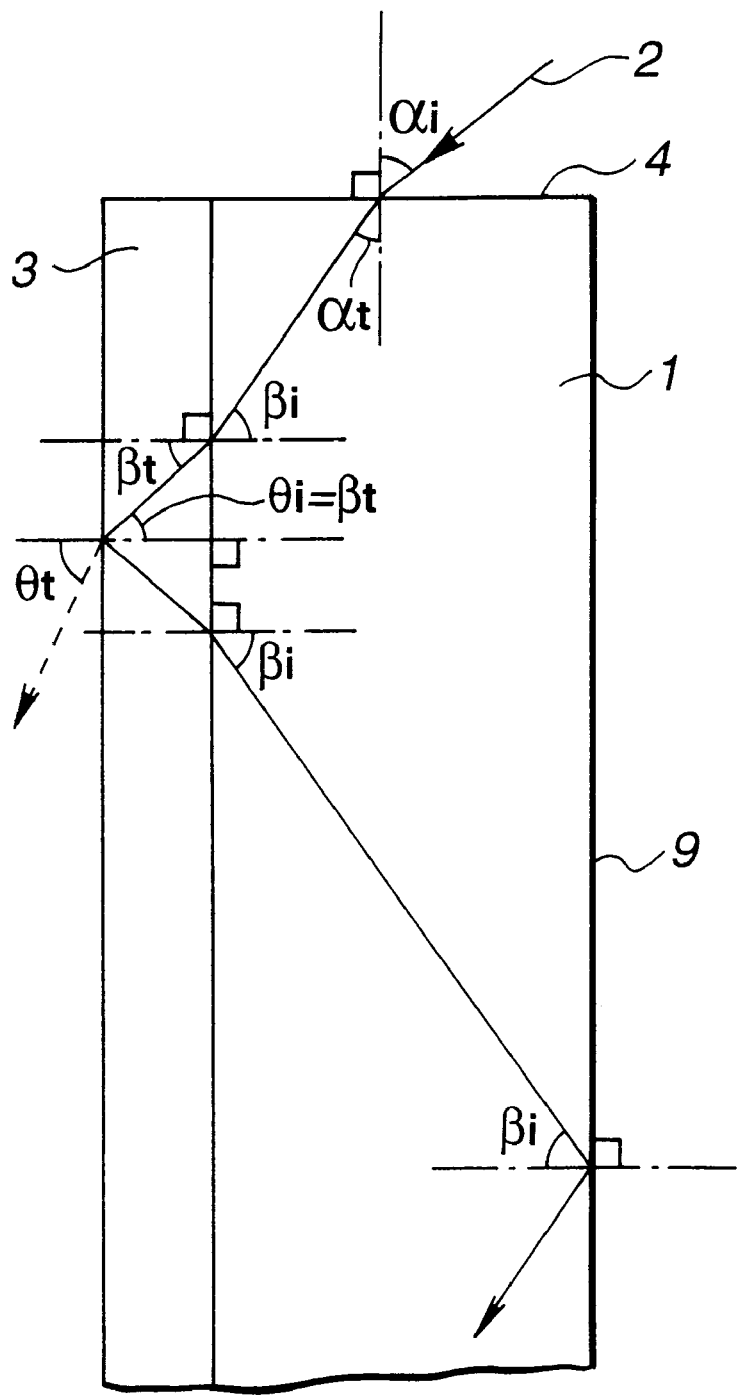
FIG. 2 is an enlarged sectional view showing a manner of reflection of light rays within a photocatalytic glass pane according to the first aspect of the present invention.

With reference to FIG. 2, there will be explained in the following a condition in which a light ray(s) 2 incident on the edge surface 4 of the glass substrate 1 of a photocatalytic glass pane according to the first aspect of the invention is reflected totally within a laminate of the glass substrate 1 and the photocatalytic film 3. The meanings of symbols in FIG. 2 and the after-mentioned n0, n1 and n2 are as follows:

$\alpha i$: angle of incidence of the light ray 2 arriving at the edge surface 4 (i.e., interface between the air and the glass substrate 1);

$\alpha t$: angle of refraction at the edge surface 4;

$\beta i$: angle of incidence of the light ray 2 arriving at an interface between the glass substrate 1 and the photocatalytic film 3;

$\beta t$: angle of refraction at the interface between the glass substrate 1 and the photocatalytic film 3;

$\theta i$: angle of incidence of the light ray 2 arriving at an interface between the photocatalytic film 3 and the air;

$\theta t$: angle of imaginary refraction at the interface between the photocatalytic film 3 and the air;

n0: refractive index of the air (i.e., 1.00);

n1: refractive index of the glass substrate (i.e., 1.53); and n2: refractive index of an anatase-type titania photocatalytic film (i.e., 2.15).

It should be noted that the above value of n2 is in connection with light rays in a wavelength range of from 320 to 390 nm. The value of n1 may slightly vary depending on the chemical composition of the glass substrate, but is mostly about 1.53 in case of soda-lime glass.

With reference to FIG. 2, the angle of incidence ($\theta i$) that is required for "total internal reflectance" within a laminate of the glass substrate 1 and the photocatalytic film 3 will be discussed as follows, provided that all of an interface between the air and the photocatalytic film 3, an interface between the photocatalytic film 3 and the glass substrate 1, and an interface between the glass substrate 1 and the air are parallel with each other and perpendicular to the edge surface 4 of the glass substrate. The angle of incidence (θi) can be expressed by the following expression (1), based on Snell's law.

$$\theta i = \sin^{-1}[(n0/n2)\sin \theta t]$$

$= \sin^{-1}(n0/n2)$, because θt required for total internal reflection is 90 degrees, (1).

In other words, if $\theta i \geq \sin^{-1}(n0/n2)$, the light ray 2 arriving at an interface between the photocatalytic film 3 and the air is totally reflected from this interface and thus does not escape into the air. This means that a light ray represented by a dotted arrow of FIG. 2 will not exist.

βi is found as follows.

$$\beta i = \sin^{-1}[(n2/n1)\sin \beta t]$$

$= \sin^{-1}[(n2/n1)\sin \theta i]$, because βt=θi, (2)

The expression (1) can be substituted for θi of the expression (2).
Thus, the expression (2) can be transformed as follows.

$$\beta i = \sin^{-1}[(n2/n1)(n0/n2)]$$

$= \sin^{-1}(n0/n1)$ (3)

$= 40.8(°)$, because n0 and n1 are the above values, respectively.

That is, if $\beta i \geq 40.8$, the light ray 2 is totally reflected from an interface between the photocatalytic film 3 and the air, irrespective of the refractive index of the photocatalytic film. The above-defined βi is expressed as follows.

$$\alpha = \sin^{-1}[(n1/n0)\sin \alpha t]$$

$= \sin^{-1}[(n1/n0)\cos \beta i]$, because αt =90.0−βi, (4)

Because βi=40.8 degrees, sin αi ≦1.14. Therefore, whatever the value of αi is, the light ray 2 is totally reflected from an interface between the photocatalytic film 3 and the air. Furthermore, as is seen from FIG. 2, it is understood that, if βi-≦40 8, the light ray 2 is also totally reflected from the other major surface 9 of the glass substrate 1. Thus, whatever the value of αi is, the light ray 2 is totally reflected from the other major surface 9, too. That is, according to the first aspect of the invention, as long as a light ray is obliquely incident on the edge surface 4 of the glass substrate 1 with whatever αi (other than perpendicular), total internal reflection of this light ray is obtained. With this, a person who faces a major surface of the glass pane can avoid exposure to the light ray (e.g., ultraviolet ray). Even if another photocatalytic film is additionally formed on the other major surface 9 of the glass substrate 1, it is understood that, whatever the value of αi is (other than perpendicular), light rays are reflected totally within a laminate of the glass substrate 1 and the photocatalytic films.

In reality, the surface of the photocatalytic film 3 may not become completely parallel with the major surfaces of the glass substrate 1. In this connection, there is known a parameter called "haze value" defined as the ratio of the scattered light ray transmittance to the total light ray transmittance. If the haze value of the photocatalytic film is, for example, 0.5%, up to 0.5% of the light ray incident on an interface between the photocatalytic film and the air at an angle of incidence that is smaller than the critical angle (i.e., 40.8 degrees) passes from the photocatalytic film into the air. However, an amount of up to 0.5% of the light ray is assumed to be negligible for human health. In other words, a photocatalytic film having a haze value of up to about 0.5% is preferably used in the invention.

In the invention, the photocatalytic film may be formed on a glass substrate by one of the following conventional methods. In sol-gel process, a titania precursor sol prepared from a titanium alkoxide or acetylacetonate is applied to a glass substrate, and then the resultant precursory film is heated to form thereon a titania film. In chemical vapor deposition (CVD), a vapor of an organic titanium compound is brought into contact with a glass substrate that is under a heated condition, thereby to form thereon a titania film by pyrolysis. In physical vapor deposition (PVD), a titania film is physically formed on a glass substrate. It is possible to adjust the haze value of the photocatalytic film to be up to 0.5% by using any of these methods.

In the invention, the escape of light rays from the edge surface 4' (see FIG. 1A) and other edge surfaces of the glass substrate 1 does not cause problems, as long as a person close to the photocatalytic glass pane faces its major surface. This escape can be prevented by covering each edge surface with a light reflective material (e.g., stainless steel and aluminum) or a light absorptive material (e.g., ceria and titania). In connection with this, it is optional to form a photocatalytic film on the entire surface of the glass substrate by dipping, except for a portion of the edge surface 4, on which the light rays are incident. With this, the escape can substantially be prevented. Furthermore, it is optional to cover edge surfaces of the glass substrate with a frame, in order to prevent the escape. If the other edge surface 4 is covered with a light reflective material, the light reflected therefrom may be used again for exciting the photocatalytic film. With this, the photocatalytic film is more effectively excited. It is optional to allow light rays to impinge on the other edge surface 4', as well as the edge surface 4, by providing another light source, in order to speed up the excitation of the photocatalytic film 3.

The following nonlimitative Examples 1–3 are illustrative of the first aspect of the present invention.

EXAMPLE 1

An anatase-type titania photocatalytic film was formed on one major surface of a glass substrate having a width of 363 mm, a length of 455 mm and a thickness of 5 mm, as follows. At first, a titania precursor sol was prepared by hydrolysis of titanium isopropoxide in isopropyl alcohol. Separately, the glass substrate 1 was partly covered with a masking film in order to cover an upper edge surface 4, a lower edge surface 4', which is opposed to the upper edge surface 4, and the other major surface 9 of the glass substrate 1, which was not intended to be covered with a photocatalytic film 3 (see FIG. 1A). Then, the glass substrate was dipped into the titania precursor sol and then gradually withdrawn, followed by drying. Then, the glass substrate was heated at about 500° C., thereby to transform a titania precursor film into an anatase-type titania photocatalytic film. The haze value of the coated glass substrate was found to be 0.3% by a haze meter.

Then, as shown in FIG. 1A, masking films were removed from the upper and lower edge surfaces 4, 4' and the other major surface 9 of the glass substrate 1. In fact, each of the upper and lower edge surfaces 4, 4' had a width of 5 mm and a length of 363 mm. Then, a lampshade 6 was disposed to cover the upper edge surface 4, and a high-pressure mercury lamp 5 was disposed within the lampshade 6. In fact, the position of the lamp 5 was adjusted to have a light intensity of 20 mW/cm$^2$ on the upper edge surface 4. The emission spectrum of the lamp 6 was a line spectrum, and relative strengths at wavelengths of 305 nm, 357 nm and 395 nm were 75%, 95% and 67%, respectively.

As shown in FIG. 1A, light rays 2 from the lamp 5 were allowed to obliquely impinge on the upper edge surface 4 of the glass substrate 1. Under this condition, it was tried to detect light rays escaping from the major surface of the photocatalytic film 3 and the other major surface 9 of the glass substrate 1 by using a MCPD-100 Spectro Multi Channel Photo Detector Luminescence Spectroscopy by Otsuka Electronics Co. Ltd. With this, no light was detected.

The photocatalytic glass pane shown in FIG. 1A prepared as above was subjected to a fogging test as follows. During the test, light rays 2 were allowed to always impinge on the upper edge surface 4 of the glass substrate 1, and the light intensity on the upper edge surface 4 was adjusted to 20 mW/cm$^2$. In the fogging test, a first step was conducted by bringing the photocatalytic glass pane into contact with a saturated steam of about 43° C. for about 3 min. Then, a second step was conducted by allowing it to stand still for about 10 min in a drier of about 40° C. and then at room temperature for 1 hr. With this, a first cycle of these steps of the fogging test was completed. In fact, ten cycles of these steps were conducted in total. The fogging on the photocatalytic film was checked by the naked eyes during the first step of each cycle. With this, no fogging was found in each of ten cycles.

COMPARATIVE EXAMPLE 1

In this comparative example, a glass substrate that is the same as that of Example 1 was subjected to the same fogging test as that of Example 1. In fact, a photocatalytic film was not formed on the glass substrate. Fogging was found in each of the third to tenth cycles of the fogging test.

EXAMPLE 2

An anatase-type titania photocatalytic film was formed on a glass substrate that is the same as that of Example 1, as follows. Firstly, a solution was prepared by adding octylene glycol to titanium tetraisopropoxide. Then, this solution was introduced by a metering pump into a stainless steel sealed container (evaporator) heated at about 200° C. Besides this solution, a dried nitrogen gas was allowed to flow through the container. The resultant gas mixture flowing out of the container was mixed with a dry air of about 200° C., thereby to prepare a CVD gas mixture. The glass substrate was transported into a heating furnace by a conveyer and then heated to about 620° C. Immediately after taking the heated glass substrate out of the furnace by the conveyer, the CVD gas mixture was blown against one major surface of the glass substrate from a CVD nozzle, thereby to form an anatase-type titania photocatalytic film thereon. The thickness of this film was 120±25 nm. The haze value of the coated glass substrate was 0.5%. Then, a lamp that is the same as that of Example 1 was disposed at a position relative to the glass substrate in the same manner as in Example 1. Then, as shown in FIG. 1A, light rays 2 from the lamp 5 were allowed to obliquely impinge on the upper edge surface 4 of the glass substrate 1. Under this condition, it was tried to detect light rays escaping from the major surface of the photocatalytic film 3 and the major surface 9 of the glass substrate 1 in the same manner as that of Example 1. With this, no light was detected.

Then, stearic acid was applied to the photocatalytic film to change the haze value from 0.5% to about 3%. Then, ultraviolet rays from the lamp were allowed to obliquely impinge on the upper edge surface 4 of the glass substrate 1 for about 20 min. After that, it was found that the haze value decreased to up to 1%.

COMPARATIVE EXAMPLE 2

In this comparative example, stearic acid was applied to one major surface of a glass substrate that is the same as that of Example 1, thereby to increase its haze value to 3%. In fact, a photocatalytic film was not formed on the glass substrate. Then, ultraviolet rays were allowed to impinge on the upper edge surface of the glass substrate in the same manner as that of Example 2. After that, it was found that the haze value did not changed at all from 3%.

EXAMPLE 3

A photocatalytic film was formed on one major surface of a glass substrate that is the same as that of Example 1, as follows. At first, a titania/silica sol was prepared by hydrolysis of titanium isopropoxide and silicon tetraethoxide in isopropyl alcohol. The weight ratio of this titanium isopropoxide to this silicon tetraethoxide was 70:30 on an oxide basis. Then, an anatase-type titania/silica photocatalytic film was formed on the glass substrate in the same manner as that of Example 1. The haze value of the coated glass substrate was found to be 0.3% by a haze meter.

As shown in FIG. 1A, light rays 2 from the lamp 5 were allowed to obliquely impinge on the upper edge surface 4 of the glass substrate 1 in the same manner as that of Example 1. Under this condition, it was tried to detect light rays escaping from the photocatalytic film 3 and the major surface 9 of the glass substrate 1 in the same manner as that of Example 1. With this, no light was detected.

Then, stearic acid was applied to the photocatalytic film to change the haze value from 0.3% to about 3%. Then, ultraviolet rays from the lamp were allowed to obliquely impinge on the upper edge surface of the glass substrate for about 20 min. After that, it was found that the haze value decreased to about 1%.

It was found that the photocatalytic film of Example 3 was superior, in adhesion to the glass substrate, to those of Examples 1 and 2 in an abrasion test using an abrasive wheel.

2. PHOTOCATALYTIC GLASS PANES ACCORDING TO THE SECOND ASPECT OF THE INVENTION

In the following, photocatalytic glass panes according to the second aspect of the present invention will be described in detail. Parts and constructions of these photocatalytic glass panes substantially the same as those of the photocatalytic glass panes of the first aspect of the invention are denoted by the same numerals and a detailed explanation of them will be omitted from the following description.

Figure 3A:
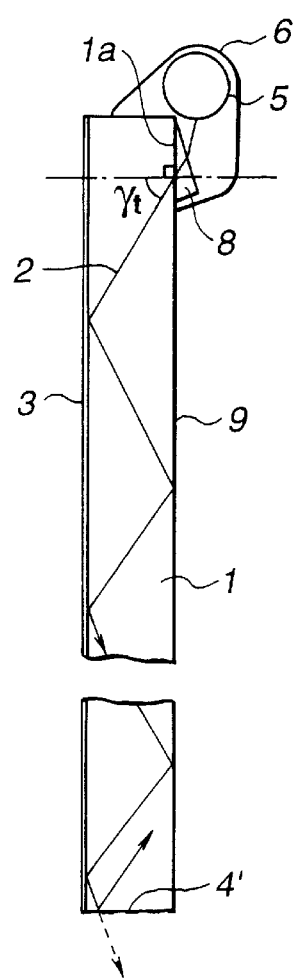
FIG. 3A is a sectional view showing a photocatalytic glass pane according to the second aspect of the present invention, in which light rays from a light source lamp impinge on a peripheral surface of the glass substrate through a prism formed on the peripheral surface.

FIG. 3A shows a photocatalytic glass pane according to the second aspect of the present invention. This photocatalytic glass pane of FIG. 3A is the same as that of FIG. 1A except that a prism 8 is formed on a peripheral surface 1a of the major surface 9 of the glass substrate 1 and that the position of the lamp 5 is slightly different from that of FIG. 1A, as will be explained hereinafter. In fact, the lamp 5 is disposed at a position relative to the glass substrate 1 such that first light rays 2 from the lamp 5 enter a laminate of the glass substrate and the photocatalytic film 3 from the peripheral surface 1a of the glass substrate 1 through the prism 8 and then, as will be clarified hereinafter, is repeatedly reflected totally within this laminate. In other words, the first light rays 2 are prevented from escaping from first and second major surfaces of the laminate. Thus, the photocatalytic film 3 is excited or activated, thereby to oxidatively decompose organic contaminants thereon. With this, the photocatalytic film 3 becomes hydrophilic, and thus fogging can be prevented.

Figure 3B:
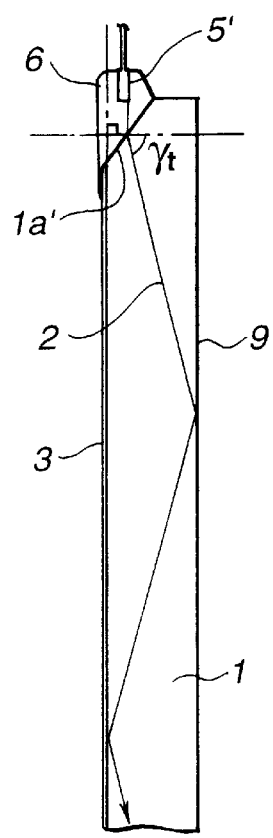
FIG. 3B is a view similar to FIG. 3A, but showing another photocatalytic glass pane, in which light rays from a light emitting nozzle impinge on an inclined peripheral surface of the glass substrate.

FIG. 3B shows another photocatalytic glass pane according to the second aspect of the present invention. The glass substrate 1 of this glass pane is formed with a tapered peripheral surface 1a', as illustrated. The light emitting nozzle 5' of FIG. 3B is directed towards the peripheral surface 1a' such that first light rays 2 from the nozzle 5' enter the glass substrate 1 from the peripheral surface 1a' and then, as will be clarified hereinafter, is repeatedly reflected totally within a laminate of the glass substrate 1 and the photocatalytic film 3.

Figure 3C:
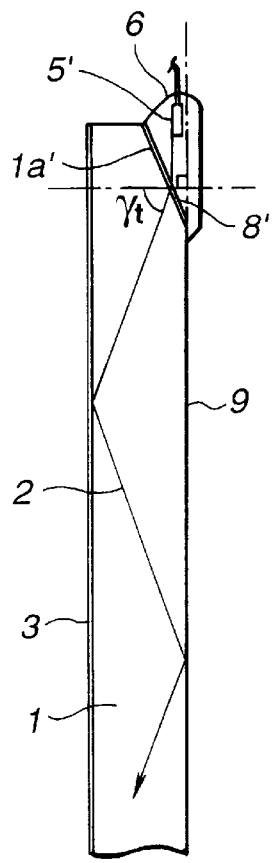
FIG. 3C is a view similar to FIG. 3A, but showing another photocatalytic glass pane, in which light rays from a light emitting nozzle impinge on an inclined peripheral surface of the glass substrate through a hologram formed on the peripheral surface.

FIG. 3C shows another photocatalytic glass pane according to the second aspect of the present invention. The glass substrate 1 of this glass pane is formed with a tapered peripheral surface 1a', as illustrated. The light emitting nozzle 5' of FIG. 3C is directed towards the peripheral surface 1a' such that first light rays 2 from the nozzle 5' enter the glass substrate 1 from the peripheral surface 1a' through a hologram 8' and then, as will be clarified hereinafter, is repeatedly reflected totally within a laminate of the glass substrate 1 and the photocatalytic film 3.

Figure 4:
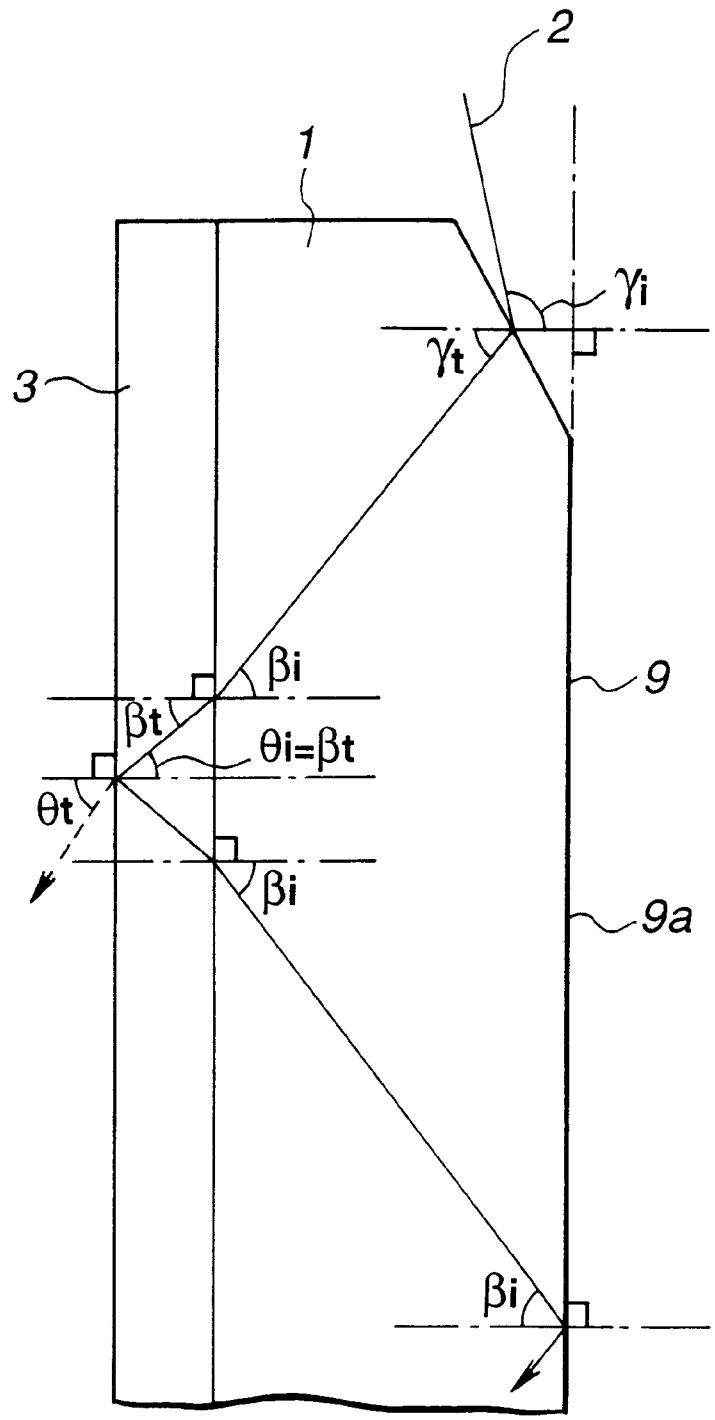
FIG. 4 is a view similar to FIG. 2, but showing a manner of reflection of light rays within a photocatalytic glass pane according to the second aspect of the present invention.

With reference to FIG. 4, there will be explained in the following a condition in which a light ray 2 incident on the peripheral surface of the glass substrate 1 of a photocatalytic glass pane according to the second aspect of the invention is reflected totally within a laminate of the glass substrate 1 and the photocatalytic film 3. The meanings of symbols in FIG. 4 and n0, n1 and n2 are defined as above, except $\gamma i$ and $\gamma t$. The meanings of $\gamma i$ and $\gamma t$ of FIG. 4 are as follows:

$\gamma i$: the angle between the light ray 2 and a normal perpendicular to a major portion 9a of the major surface 9, at a point where the light ray 2 is incident on the peripheral surface; and $\gamma t$: the angle between the light ray 2 passing through the glass substrate and the normal at the point in FIG. 4. As stated above in connection with FIG. 2, if $\beta i$ of FIG. 4 $\geq 40.8$ degrees, the light ray 2 is totally reflected from an interface between the photocatalytic film 3 and the air, irrespective of the refractive index of the photocatalytic film 3. Due to the geometrical relationship between $\beta i$ and $\gamma t$, $\beta i = \gamma t$. Therefore, if $\gamma t \geq 40.8$ degrees, the light ray 2 is totally reflected within a laminate of the glass substrate 1 and the photocatalytic film 3. The above-defined $\gamma i$ is expressed as follows.

$\gamma i = \sin^{-1}[(n1/n0)\sin \gamma t]$ $= \sin^{-1}[(n1/n0)\sin \beta i]$, because $\beta i = \gamma t$.

Figure 5:
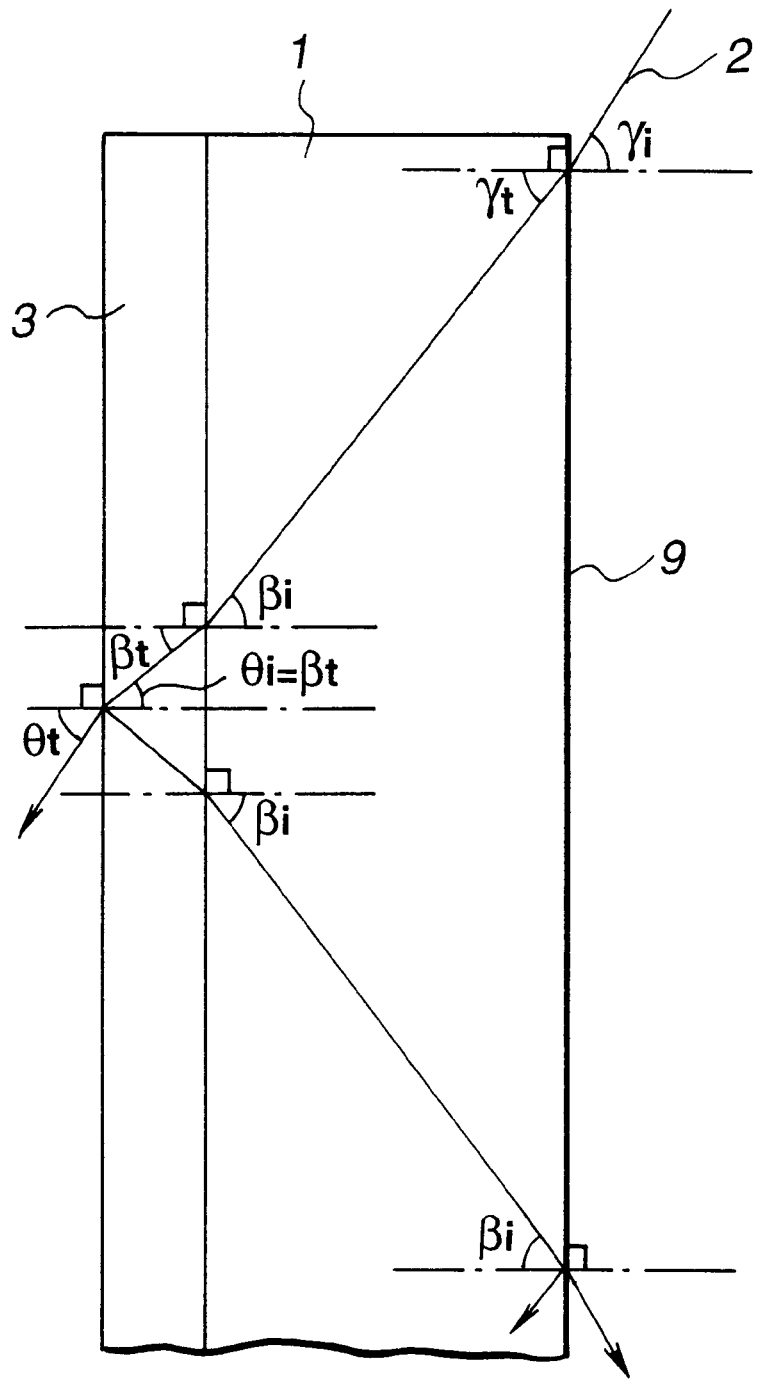
FIG. 5 is a view similar to FIG. 2, but showing a manner of reflection of light rays through a photocatalytic glass pane not according to the present invention.

Since $\beta i \geq 40.8$ degrees, it becomes necessary that $\gamma i > 90$ degrees. As shown in FIG. 4, if $\gamma i > 90$ degrees, the light ray 2 can be totally reflected within a laminate of the glass substrate 1 and the photocatalytic film 3. In other words, as shown in FIG. 5, if the light ray 2 is incident on a periphery of the major surface 9 of the glass substrate 1, which major surface is totally flat unlike the major surface 9 of FIG. 4, $\gamma i$ becomes less than 90 degrees. With this, $\gamma t$ or $\beta i$ becomes less than 40.8 degrees. Therefore, the light ray 2 is not totally reflected within a laminate of the glass substrate 1 and the photocatalytic film 3. In fact, at least a part of the light ray 2 of FIG. 5 emerges from the photocatalytic film 3 into the air at an angle of $\theta t$, as shown by a solid line (arrow) in FIG. 5. It should be noted that symbols of FIG. 5 have respective meanings that are substantially the same as those of FIG. 4.

According to the second aspect of the invention, a prism 8 may be formed on the periphery 1a of the major surface 9, as shown in FIG. 3A. With this, $\beta i$ or $\gamma t$ easily becomes at least 40.8 degrees. Thus, the light ray 2 of FIG. 3A is totally reflected within a laminate of the glass substrate 1 and the photocatalytic film 3. The prism 8 of FIG. 3A may be suitably adjusted in vertical angle and refractive index, in view of the position of the lamp 5.

According to the second aspect of the invention, it is optional to have an inclined peripheral surface 1a', as shown in FIG. 3B. If the light ray 2 is allowed to impinge on the peripheral surface 1a', it becomes possible to adjust $\gamma i$ and $\gamma t$ to be larger than 90 degrees and at least 40.8 degrees, respectively. With this, the light ray 2 of FIG. 3B is totally reflected within a laminate of the glass substrate 1 and the photocatalytic film 3. It is optional to emit the sunlight or ultraviolet rays from the light emitting nozzle 5' of FIG. 3B or 3C. Furthermore, it is optional to place a light source at another place away from the photocatalytic glass pane and transmit the light from the light source through an optical fiber towards the nozzle 5' of FIG. 3B or 3C.

According to the second aspect of the invention, it is optional to have a hologram 8' formed on an inclined peripheral surface 1a', as shown in FIG. 3C, such that the reflected light is diffracted to adjust $\gamma t$ to be at least 40.8 degrees.

It is needless to say that a photocatalytic glass pane according to the second aspect of the invention may have two photocatalytic films formed on both major surfaces of the glass substrate, as long as $\gamma t$ is adjusted to be at least 40.8 degrees.

The following nonlimitative Examples 4–5 are illustrative of the second aspect of the present invention.

EXAMPLE 4

At first, as shown in FIG. 3A, an anatase-type titania photocatalytic film 3 having a thickness of 153±20 nm was formed on one major surface of a glass substrate 1 that is the same as that of Example 1 by a method that is the same as that of Example 1. The haze value of the coated glass substrate was found to be 0.3% by a haze meter.

Then, a prism 8 having a refractive index that is the same as that of the glass substrate 1 was formed on a peripheral portion, having a length of 363 mm and a width of 10 mm, of the other major surface 9 of the glass substrate 1. Then, a lampshade 6 was disposed on the glass substrate to cover the prism 8, and a high pressure mercury lamp 5 was disposed in the lampshade 8. The position of the lamp 5 was adjusted such that the light intensity of the light ray 2 on the surface of the prism 8 was 20 mW/cm$^2$.

As shown in FIG. 3A, light rays 2 from the lamp 5 were allowed to impinge on the prism 8. Under this condition, it was tried to detect light rays escaping from the photocatalytic film 3 and the other major surface 9 of the glass substrate 1 by the same method as that of Example 1. With this, no light was detected.

The photocatalytic glass pane shown in FIG. 3A prepared as above was subjected to the same fogging test as that of Example 1. During the fogging test, light rays 2 were allowed to always impinge on the prism 8 as shown in FIG. 3A. No fogging was found in each of ten cycles of the fogging test by the same check as in Example 1.

EXAMPLE 5

At first, as shown in FIG. 3A, an anatase-type titania photocatalytic film having a thickness of 120±25 nm was formed on one major surface of a glass substrate 1 that is the same as that of Example 1 by a CVD method that is the same as that of Example 2. The haze value of the coated glass substrate was 0.5%. Then, a prism 8, a lampshade 6, and a high pressure mercury lamp 5 were disposed at respective positions as described in Example 4.

The photocatalytic glass pane shown in FIG. 3A prepared as above was subjected to the same fogging test as that of Example 1. During the fogging test, light rays 2 were allowed to always impinge on the prism 8 as shown in FIG. 3A. No fogging was found in each of ten cycles of the fogging test by the same check as in Example 1.

In the invention, the glass substrate 1 may be replaced with a laminate of two glass substrates having an adhesive interlayer therebetween. A glass substrate used in the invention may contain a small amount of $CeO_2$, $TiO_2$ and the like such that this glass substrate becomes ultraviolet absorptive. In this case, it is preferable to emit a larger amount of light rays in ultraviolet region in order to sufficiently activate the photocatalytic film. A glass substrate used in the invention may be a curved glass plate and furthermore optionally tempered.

The entire disclosure of each of Japanese Patent Application Nos. 9-290650 filed on Oct. 23, 1997 and 9349089 filed on Dec. 18, 1997, including specification, claims, drawings and summary, is incorporated herein by reference in its entirety.

What is claimed is:

1. A photocatalytic glass pane comprising:
    a glass substrate having (1) first and second major surfaces that are substantially parallel with and opposed to each other and (2) an edge surface that connects said first and second major surfaces together;
    a photocatalytic film formed on at least one of said first and second major surfaces of said glass substrate; and
    a light source for exciting said photocatalytic film, said light source being disposed at a position relative to a laminate of said glass substrate and said photocatalytic film such that a first light from said light source enters said glass substrate from said edge surface and then is reflected totally within said laminate, thereby to excite said photocatalytic film and to prevent said first light from escaping from first and second major surfaces of said laminate.

2. A glass pane according to claim 1, further comprising a first covering member covering said light source such that a second light from said light source, which does not enter said laminate, is concealed by said first covering member.

3. A glass pane according to claim 1, wherein said position of said light source is away from and in the vicinity of said edge surface of said glass substrate.

4. A glass pane according to claim 1, further comprising a transparent interlayer film interposed between said photocatalytic film and said first or second major surface of said glass substrate, said interlayer film being made of an oxide and having a refractive index that is lower than that of said photocatalytic film.

5. A glass pane according to claim 1, wherein said first light from said light source comprises ultraviolet rays.

6. A glass pane according to claim 1, wherein said edge surface of said glass substrate is substantially perpendicular to each of said first and second major surfaces of said glass substrate.

7. A glass pane according to claim 1, wherein said photocatalytic film comprises an anatase-type titania as a photocatalytic substance.

8. A glass pane according to claim 7, wherein said photocatalytic film further comprises at least one oxide selected from the group consisting of silica, alumina, tin oxide, and zirconium oxide.

9. A glass pane according to claim 1, wherein said light source is adjusted such that said first light therefrom is obliquely incident on said edge surface of said glass substrate.

10. A glass pane according to claim 1, wherein said photocatalytic film is adjusted to have a haze value of not higher than about 0.5%.

11. A glass pane according to claim 1, wherein said edge surface of said glass substrate has (1) a first portion, from which said first light enters said glass substrate, and (2) a second portion that is covered with a second covering member, thereby to prevent said first light from escaping from said second portion of said edge surface.

12. A glass pane according to claim 1, wherein, when said first light is reflected totally within said laminate, said first light passes from said glass substrate into said photocatalytic film at an angle of incidence of at least about 40.8 degrees.

13. A photocatalytic glass pane comprising:
    a glass substrate having first and second major surfaces that are substantially parallel with and opposed to each other;
    a photocatalytic film formed on at least one of said first and second major surfaces of said glass substrate; and
    a light source for exciting said photocatalytic film, said light source being disposed at a position relative to a laminate of said glass substrate and said photocatalytic film such that a first light from said light source enters said glass substrate from a peripheral surface of said glass substrate, which peripheral surface does not have thereon said photocatalytic film, and then said first light passes from said glass substrate into said photocatalytic film at an angle of incidence, thereby to reflect said first light totally within said laminate to excite said photocatalytic film.

14. A glass pane according to claim 13, wherein said angle of incidence is at least about 40.8 degrees.

15. A glass pane according to claim 13, wherein said peripheral surface is inclined such that said glass substrate is tapered at a position of said peripheral surface and thus that said angle of incidence becomes at least about 40.8 degrees.

16. A glass pane according to claim 13, further comprising a first covering member covering said light source such that a second light from said light source, which does not enter said glass substrate, is concealed by said first covering member.

17. A glass pane according to claim 13, wherein said position of said light source is away from and in the vicinity of said edge surface of said glass substrate.

18. A glass pane according to claim 13, further comprising a transparent interlayer film interposed between said photocatalytic film and said first or second major surface of said glass substrate, said interlayer film being made of an oxide and having a refractive index that is lower than that of said photocatalytic film.

19. A glass pane according to claim 13, wherein said first light from said light source comprises ultraviolet rays.

20. A glass pane according to claim 13, wherein said photocatalytic film comprises an anatase-type titania as a photocatalytic substance.

21. A glass pane according to claim 20, wherein said photocatalytic film further comprises at least one oxide selected from the group consisting of silica, alumina, tin oxide, and zirconium oxide.

22. A glass pane according to claim 13, wherein said photocatalytic film is adjusted to have a haze value of not higher than about 0.5%.

23. A glass pane according to claim 13, wherein said glass substrate has an edge surface that connects said first and second major surfaces together, said edge surface being covered with a second covering member, thereby to prevent said first light from escaping from said edge surface.

24. A glass pane according to claim 13, wherein said peripheral surface of said glass substrate has thereon a prism such that said first light enters said prism and then said laminate and that said angle of incidence becomes at least about 40.8 degrees.

25. A glass pane according to claim 13, wherein said peripheral surface of said glass substrate is inclined such that said glass substrate is tapered at a position of said peripheral surface, and wherein said peripheral surface has thereon a hologram such that said first light enters said hologram and then said laminate and that said angle of incidence becomes at least about 40.8 degrees.

* * * * *